US 6,654,038 B1

(12) United States Patent
Gajewska et al.

(10) Patent No.: US 6,654,038 B1
(45) Date of Patent: Nov. 25, 2003

(54) KEYBOARD NAVIGATION OF NON-FOCUSABLE COMPONENTS

(75) Inventors: Hania Gajewska, Woodside, CA (US); David P Mendenhall, New York, NY (US); Peter A. Korn, Oakland, CA (US); Michael C. Albers, San Francisco, CA (US); Lynn Monsanto, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 427 days.

(21) Appl. No.: 09/586,041

(22) Filed: Jun. 2, 2000

(51) Int. Cl.[7] .................................................. G06F 3/00
(52) U.S. Cl. ........................ 345/802; 345/168; 345/172; 345/767; 345/854
(58) Field of Search ................................ 345/168, 172, 345/762–765, 767, 781, 802, 803, 810, 835, 853, 854

(56) References Cited

U.S. PATENT DOCUMENTS

| 5,625,763 | A | * | 4/1997 | Cirne | 345/767 |
| 5,721,850 | A | * | 2/1998 | Farry et al. | 345/700 |
| 5,982,351 | A | * | 11/1999 | White et al. | 345/172 |
| 6,003,050 | A | * | 12/1999 | Silver et al. | 715/536 |
| 6,072,485 | A | * | 6/2000 | Barnes et al. | 345/163 |
| 6,249,284 | B1 | * | 6/2001 | Bogdan | 345/764 |
| 6,256,030 | B1 | * | 7/2001 | Berry et al. | 345/854 |
| 6,310,634 | B1 | * | 10/2001 | Bodnar et al. | 345/854 |
| 6,317,144 | B1 | * | 11/2001 | Pabla et al. | 345/784 |
| 6,366,920 | B1 | * | 4/2002 | Hoose et al. | 707/102 |

OTHER PUBLICATIONS

Mark McCulley, "Focus on Swing", Jul. 1998, JavaWorld, pp. 1–8.*
IBM Technical Disclosure Bulletin, "Increasing the Usability of Focus–Driven Information Line Text", Jul. 1995, IBM Corporation pp. 217–218.*

* cited by examiner

Primary Examiner—John Cabeca
Assistant Examiner—X. L. Bautista
(74) Attorney, Agent, or Firm—Rosenthal & Osha L.L.P.

(57) ABSTRACT

A method for keyboard navigation in a graphical user interface, including defining a key event dispatcher for focus ordering of at least one non-focusable component, configured to recognize a special mode entry character and a special mode exit character, upon entry of the special mode entry character by a user, entering a special mode wherein subsequent key events are manipulated by the key event dispatcher to navigate the focus ordering of the at least one non-focusable component while a current focus owner is maintained, and exiting the special mode upon entry of the special mode exit character by the user, wherein the special mode is at least one of the group consisting of an input method mode, an accessible navigation mode and a window navigation mode.

19 Claims, 13 Drawing Sheets

KEYBOARD NAVIGATION OF NON-FOCUSABLE COMPONENTS

BACKGROUND OF THE INVENTION

1. Technical Field

The invention relates to windowing toolkits for computers.

2. Background Art

The basic functionality of a computer is dictated both by the hardware of the computer and by the type of operating system it uses. Various operating systems exist in the marketplace, including Solaris from Sun Microsystems, Mac OS from Apple Computer, the "Windows" operating systems, e.g., Windows 95/98 and Windows NT, from Microsoft, and Linux. A given combination of computer hardware, an operating system, and a windowing system will be referred to herein as a "platform". Prior to the popularity of the Internet, software developers wrote programs specifically designed for individual platforms. Thus, a program written for one platform could not be run on another. However, the advent of the Internet made cross-platform compatibility a necessity.

Figure 1:
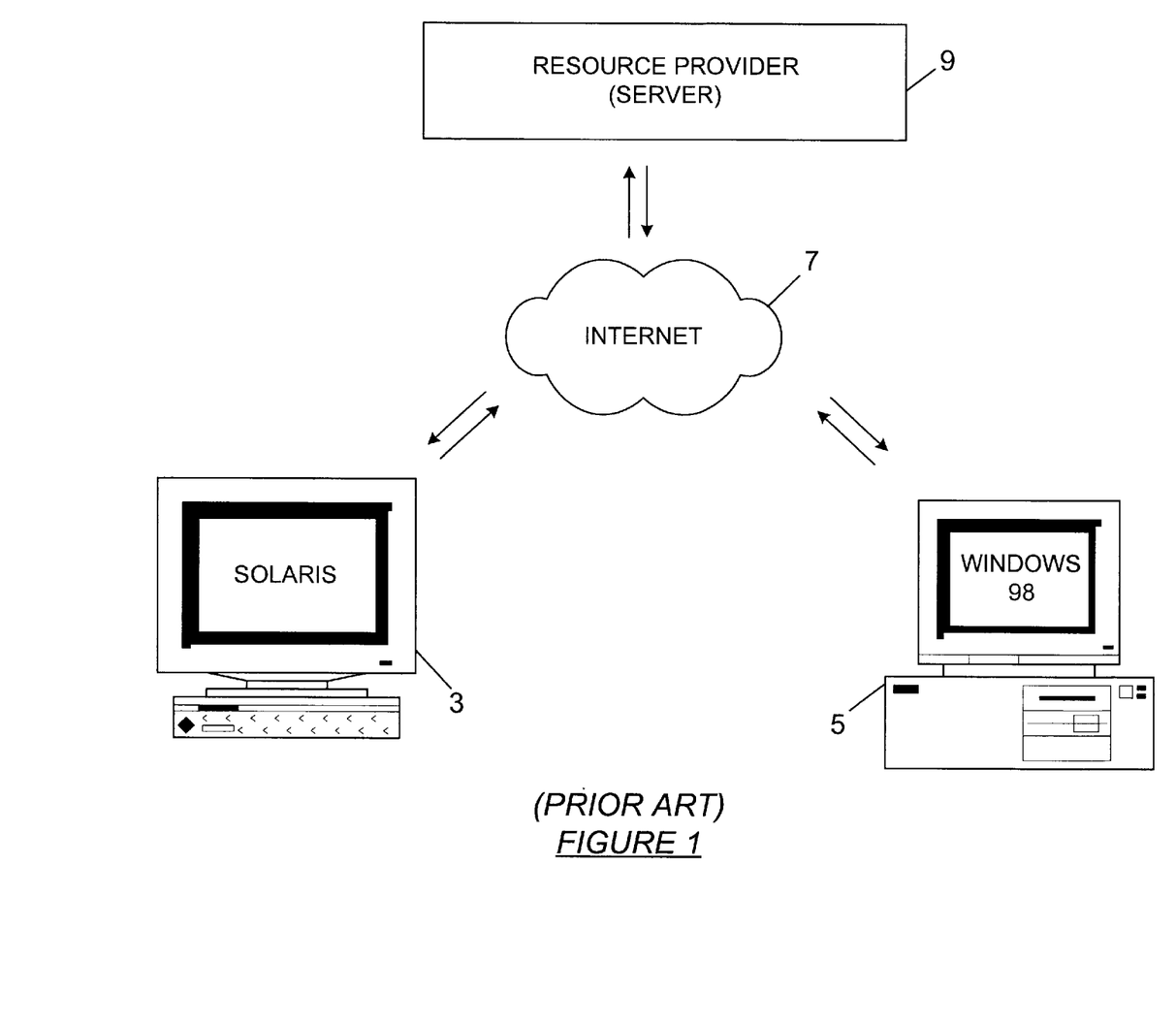
FIG. 1 illustrates a multiple platform environment.

Prior art FIG. 1 illustrates a conceptional arrangement wherein a first computer 3 running the Solaris platform and a second computer 5 running the Windows 98 platform are connected to a server 9 via the Internet 7. A resource provider using the server 9 might be any type of business, governmental, or educational institution. The resource provider has a need to be able to provide its resources to both the user of the Solaris platform and the user of the Windows 98 platform, but does not have the luxury of being able to custom-design its content for the individual platforms.

The Java™ programming language was developed by Sun Microsystems to address this problem. The Java™ programming language was designed to be simple for the programmer to use, yet to be able to run securely over a network and work on a wide range of platforms.

Figure 2:
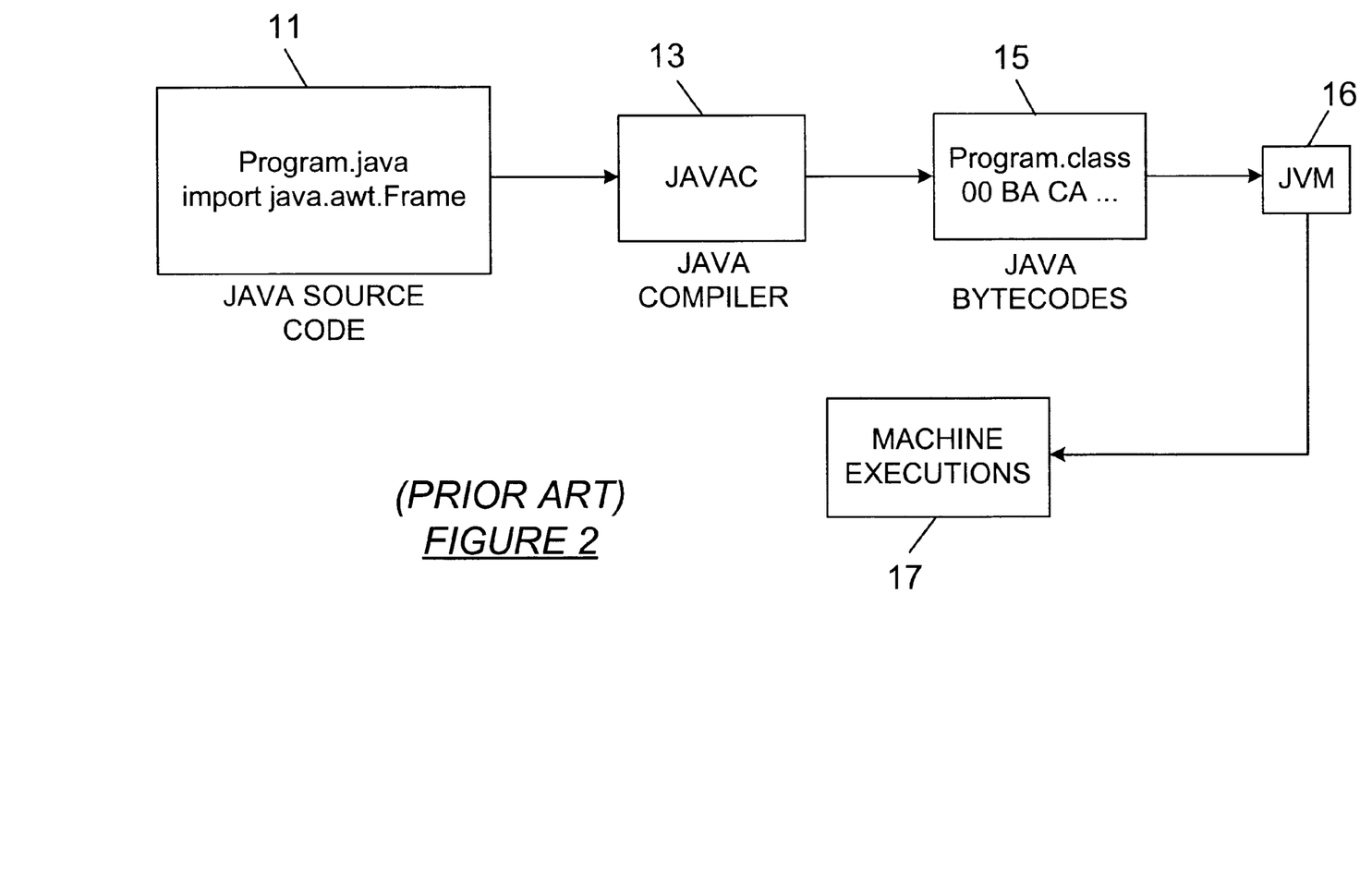
FIG. 2 illustrates a mechanism for creating Java™ applications.

Referring to FIG. 2, in order to create a Java™ application, the developer first writes the application in human-readable Java™ source code. As used herein, the term "application" refers to both true Java™ applications and Java™ "applets" which are essentially small applications usually embedded in a web page. In the example shown, the application "Program" 11 is created as a human-readable text file. The name of this text file is given the required character extension "Java".

A Java™ compiler such as Sun Microsystem's "javac" 13 is used to compile the source code into a machine-readable binary file 15. The text file will contain Java™ language commands, e.g., "import java.awt.Frame". A discussion of the Java™ language itself is beyond the scope of this document. However, complete information regarding the Java™ program language is available from Sun Microsystems both in print and via the Internet at java.sun.com. The resulting binary file 15 will automatically receive the same file name as the source text file, but will use ".class" as the trailing extension. The Java™ runtime environment incorporates a Java™ "virtual machine" (JVM) 16 to convert the ".class" byte codes into actual machine executions 17. The machine executions (like drawing windows, buttons, and user prompt fields) will occur in accordance to the application developer's code instructions. Because Sun Microsystems specifically designed the JVM to run on different platforms, a single set of ".class" byte codes will execute on any platform where a JVM has been installed. An Internet browser such as Netscape Navigator and Microsoft Explorer that incorporates a JVM is called a "Java™ enabled" browser.

Figure 3:
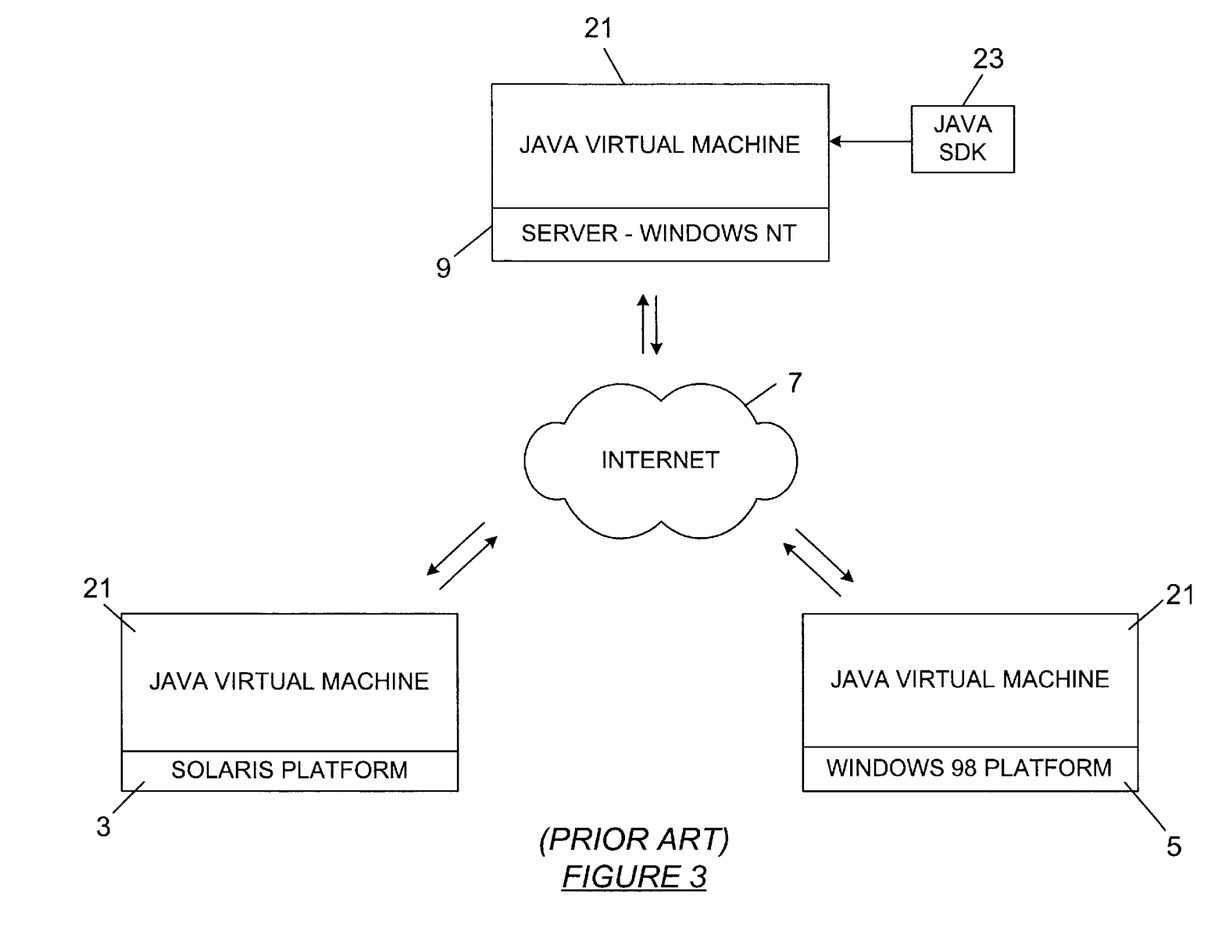
FIG. 3 illustrates a Java™ application running in a multiple platform environment.

The cross-platform architecture of the Java™ programming language is illustrated in FIG. 3, which shows how the Java™ language enables cross-platform applications over the Internet. In the figure, the computer 3 running the Solaris platform and the computer 5 running the Windows 98 platform are each provided with a Java™ virtual machine 21. The resource provider creates a Java™ application using the Java™ software development kit ("SDK") 23 and makes the complied Java™ byte codes available on the server 9, which in this example is running on a Windows NT platform. Through standard Internet protocols, both the computer 3 and the computer 5 may obtain a copy of the same byte codes and, despite the difference in platforms, execute the byte codes through their respective JVM.

Figure 4:
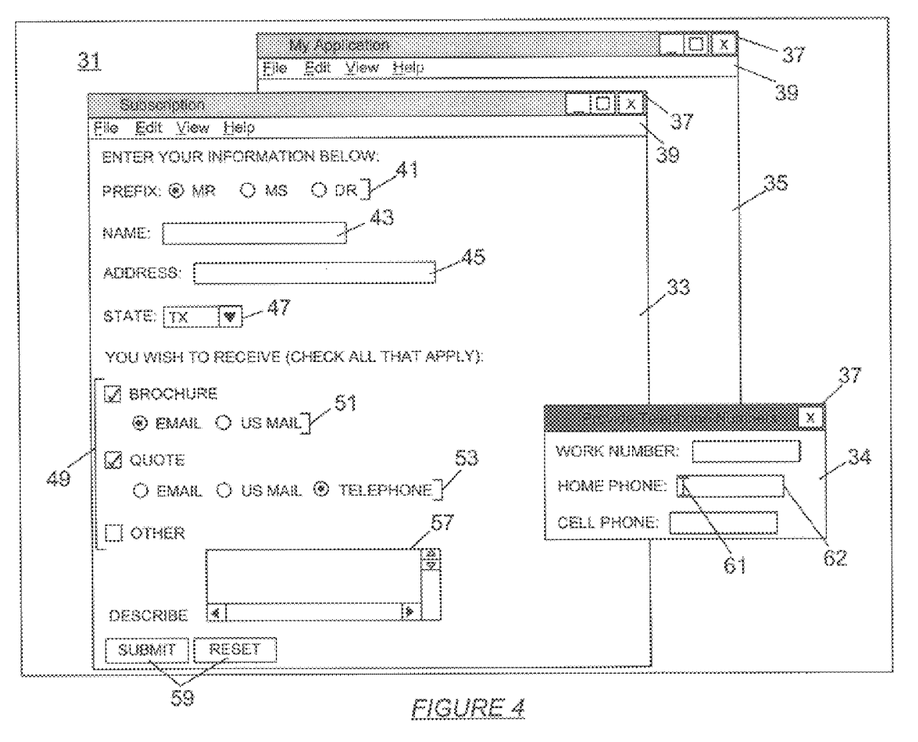
FIG. 4 illustrates a typical graphical user interface (GUI).

FIG. 4 illustrates an exemplary display on a screen 31 including top-level windows 33, 34, and 35. Each window includes a title bar 37 for displaying the title of the window and, if applicable, a menu bar 39 containing a number of pull down menu buttons defined by the developer. In this example, window 34 is the "active" window, as indicated by the darkened title bar. Windows 33 and 35 are inactive as indicated by the grayed out title bar. The window 33 includes a number of typical components, including "radio buttons" 41 which in this case allow the user to select a prefix, a text field 43 for entering a name, and an address field 45 for entering an address. Component 47 is a "chooser", allowing the user to choose a state. Components 49 are check boxes that allow the user to check one or all of the options that apply. Associated with these check boxes are additional radio buttons 51 and 53 that allow the user to select a desired means of transmission. If the "quote" check box 49 is selected and the telephone radio button is selected, the window 34 appears allowing the user to enter telephone numbers. An additional text area 57 is associated with the "other" check box 49. Finally, "submit" and "reset" buttons 59 are provided to allow the user to either submit the form or reset it.

When developing a graphical user interface (GUI) such as the example shown in FIG. 4, one issue for consideration by the application developer is the concept of "focus". Traditionally, the "focus owner" is the component that, at a given time, receives keyboard input generated by the application user. The user, of course, has the ability to transfer focus between components. The primary method for changing focus is by clicking on a new component using a mouse. However, an alternate way of changing focus is by using the keyboard. Using the keyboard to change focus is referred to as "focus traversal". Typically, focus traversal is achieved using pre-defined keys on the keyboard (for example, the TAB key) or some equivalent device in an accessible environment. For example, referring again to FIG. 4, a cursor 61 (which would be blinking) is shown in the "home phone" text field 62. This means component 62 is the focus owner, and keyboard input generated by the user would be sent to that field. Typically, the user may then move to the next component ("cell phone") without using the mouse by simply hitting the TAB key, or return to the previous component ("work number") by hitting SHIFT-TAB. This is referred to as forward and backward focus traversal, respectively. In addition to user-initiated traversal, client code can also initiate traversal programmatically.

SUMMARY OF THE INVENTION

In one aspect, the invention relates to a method for keyboard navigation in a graphical user interface, comprising: defining a key event dispatcher configured to recognize a special mode entry character and a special mode exit character; upon entry of the special mode entry character by a user, entering a special mode wherein subsequent key events are manipulated by the key event dispatcher while a current focus owner is maintained; and exiting the special mode upon entry of the special mode exit character by the user. In some embodiments, the special mode comprises an input method mode, and wherein manipulation of subsequent key events comprises diverting key events to an input method object.

In some embodiments, the special mode comprises an accessible navigation mode, and wherein manipulation of subsequent key events comprises using the key events to navigate the graphical user interface in accordance with an accessible navigation policy.

In some embodiments, the special mode comprises a window navigation mode, and wherein manipulation of subsequent key events comprises using the key events to navigate a plurality of windows in accordance with a window navigation policy.

In another aspect, the invention relates to a windowing toolkit for development of a graphical user interface, the toolkit comprising a plurality of tools having code suitable to be executed by a computer, the toolkit comprising: a first tool for defining a special mode entry character and a special mode exit character; a second tool for defining a special mode to be entered upon entry of the special mode entry character and to be exited upon entry of the special mode exit character, the second tool providing a manipulation mechanism by which key events are manipulated while in the special mode and while maintaining a current focus owner.

In some embodiments, the special mode defined by the second tool comprises an input method mode, and wherein the manipulation mechanism diverts key events to an input method object.

In some embodiments, the special mode defined by the second tool comprises an accessible navigation mode, and wherein the manipulation mechanism uses the key events to navigate the graphical user interface in accordance with an accessible navigation policy.

In some embodiments, the special mode defined by the second tool comprises a window navigation mode, and wherein the manipulation mechanism uses the key events to navigate a plurality of windows in accordance with a window navigation policy.

DETAILED DESCRIPTION OF THE INVENTION

Various embodiments of the invention will now be described with reference to the accompanying figures. Like elements in the figures are represented by like numerals for consistency.

Figure 6:
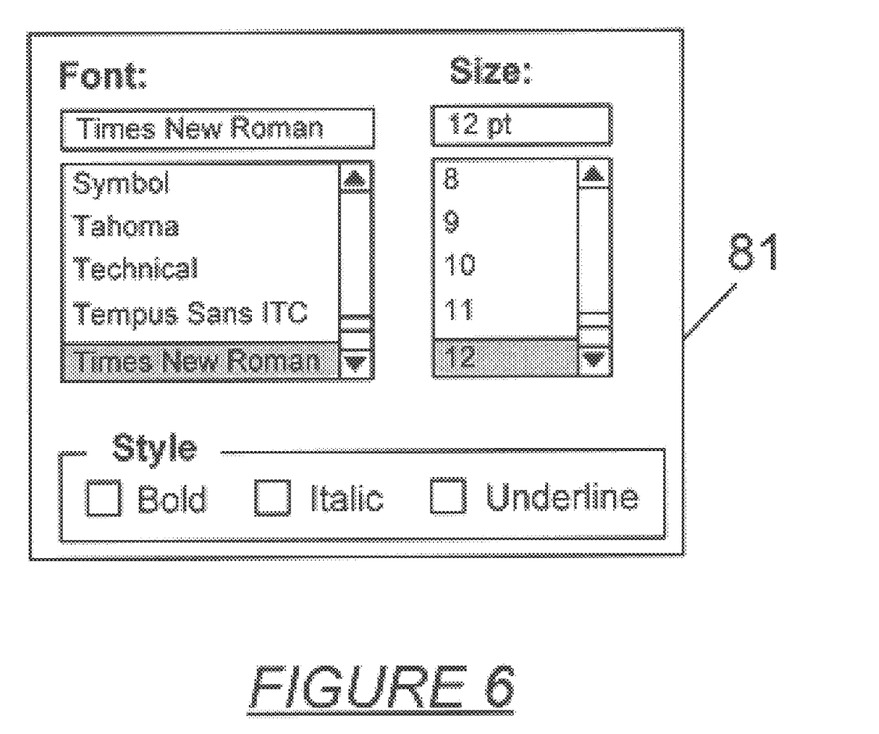
FIG. 6 illustrates an example of a "font chooser" palette.

The invention described herein may be implemented on virtually any type of computer regardless of the platform being used. For example, as shown in FIG. 6, a typical computer 71 will have a processor 73, associated memory 75, and numerous other elements and functionalities typical to today's computers (not shown). The computer 71 will have associated therewith input means such as a keyboard 77 and a mouse 79, although in an accessible environment these input means may take other forms such as a special input device designed for a disabled user. The computer 71 will also be associated with an output device such as a display 81, which may also take a different form in an accessible environment. Computer 71 is connected via a connection means 83 to the Internet 7. The computer 71 is configured to run a Java™ virtual machine 21, implemented either in hardware or in software.

As explained above, existing windowing toolkits define the "focus owner" as the component on the screen that receives keystrokes input by the user. Although the mouse is the primary means of changing focus, the user usually is also provided with a way of using the keyboard to change which component is the focus owner. This process is referred to as "focus traversal". Typically, focus traversal reaches only those components that expect to receive keystrokes. This is because it would be a waste of time to force the user to traverse through labels and other fields that do not accept keystrokes. Returning to FIG. 4 for example, while a typical user would want to be able to traverse, e.g., radio buttons 41 and text field 43, the user would not want to have to traverse also through the labels "PREFIX", "MR", "MS", "DR", and "NAME". These labels can simply be read on the screen. Thus, labels normally cannot be reached using focus traversal.

Another example is a window such as a font chooser 81 shown in FIG. 6. No component in this window ever expects keystrokes, so typically no component in the window can be reached by focus traversal. Although the developer may define "keyboard short-cuts" as an alternative way to access the functionality of such windows, it is desirable to provide the developer with a mechanism by which this can be achieved using keyboard navigation as well.

A system is referred to as "accessible" if it can be used by a disabled user. Many levels and types of accessibility exist given the many types of disabilities that must be considered. Taking, for example, a system accessible to blind users, the user must be able to navigate every component on a screen via the keyboard so that the component's description can be read out by a screen reader. However, this is at odds with the definition above that only components desiring keyboard input are reachable by keyboard navigation. For example, a window acting as a font chooser (regardless of whether part of an application written in Java™, VisualBasic, J++, HTML, etc.) does not typically use keyboard input as explained above. In other words, such a window will not typically need or want focus because a mouse is the common method of interacting with such palette windows. Yet, a custom application designed for a blind user would need to allow for non-mouse input on such a font chooser window. Thus, in the area of focus management, the current focus model forces the application developer to expend double effort on parallel development of standard and specialized applications. This font chooser window scenario highlights the fact that current GUI software development kits (SDKs) do not provide easy and elegant means to create source code that supports the traditional focus model as well as special models (where non-focusable components need awareness of events normally known only by those components with focus).

In accordance with the above, the invention provides a mechanism by which keyboard navigation of all windows and components in a given application is possible, while at the same time retaining the non-focusable properties of the normally non-reachable windows and components and without stealing focus from a currently focused component. Thus, an important feature of the invention is the ability to deliver key events (i.e., keystrokes) to non-focused components without affecting the current focus status. In one embodiment, this may be achieved by registering one or more "key event dispatchers" with a "keyboard focus manager". The keyboard focus manager is responsible for dispatching all user-generated key events and serves as a gateway between key input from the user and delivery of the key event to the focus owner. The key event dispatcher cooperates with the keyboard focus manager in the targeting and dispatching of key events. Registered key event dispatchers will receive key events before the events are dispatched by the keyboard focus manager to the focus owner. Thus, the key event dispatcher is able to retarget the event, consume it, dispatch it itself, edit the event, and/or deliver it to components other than the current "true" focus owner.

Figure 7:
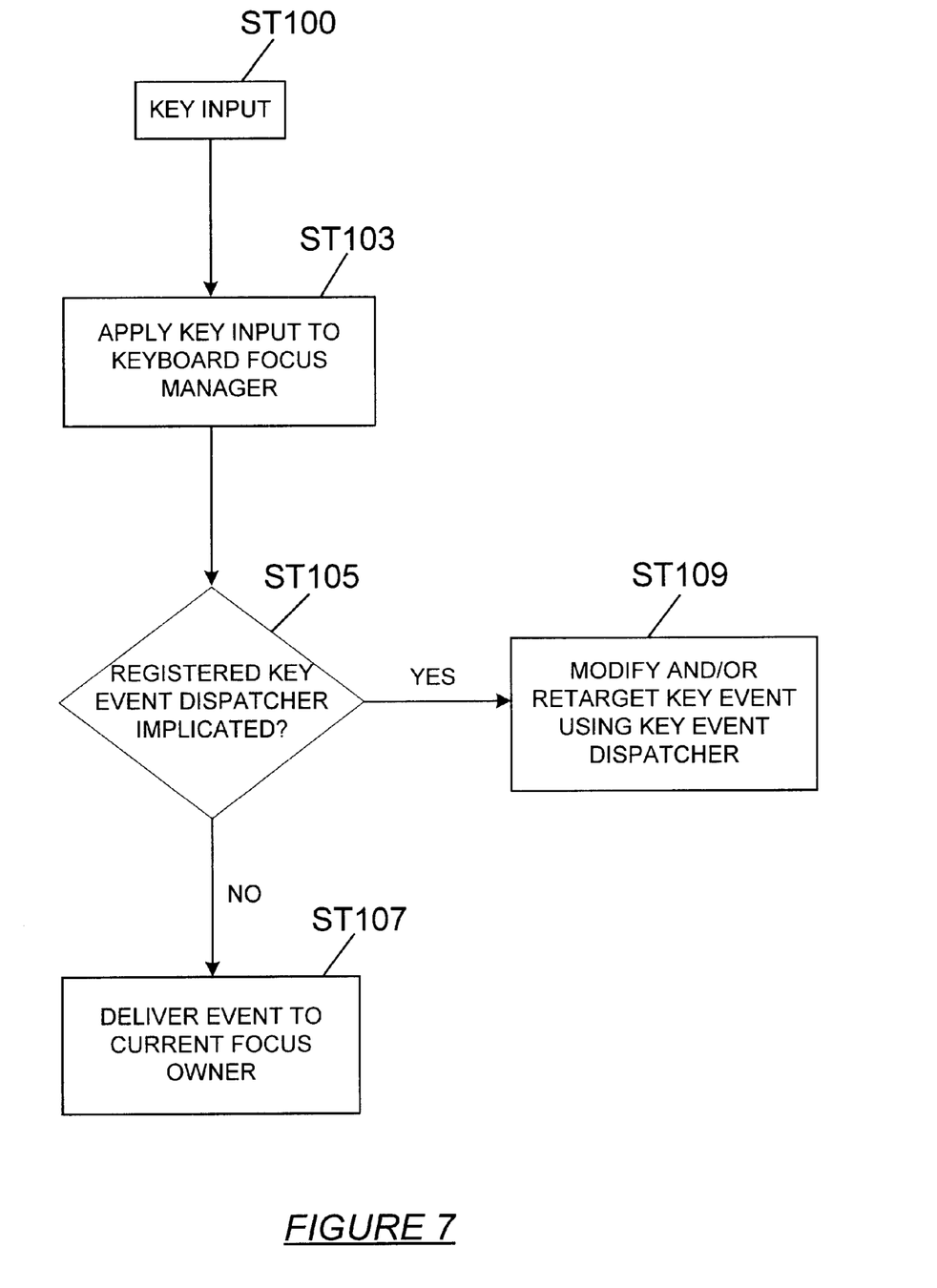
FIG. 7 is a flowchart illustrating a process in accordance with one embodiment of the invention.

The above process is further explained with reference to FIG. 7. In this figure, at ST100 a key input is made by a user. The key input is then applied to the keyboard focus manager (ST103). The keyboard focus manager then determines if a registered key event dispatcher is implicated by the key input (ST105). If the response to this inquiry is no, the key event is delivered to the current focus owner (ST107). If a registered key event dispatcher is implicated, the key event is then modified, consumed, and/or re-targeted by the key event dispatcher in accordance with its definition (ST109). This definition may include, for example, editing the key event and returning it to the keyboard focus manager for delivery to the current focus owner, delivering the key event itself, consuming the key event altogether, or delivering the event to a component other than the current focus owner. Thus, the application developer will have greatly enhanced flexibility to address focus traversal issues, particularly with respect to accessibility, without hindering or compromising other features of current windowing toolkits.

One example of an application of the key event dispatcher of the invention is "input method" implementation. An input method is a way of combining multiple keystrokes to create entry characters that are not available on the keyboard. For example, input methods are used to allow input in a language written in a character set other than that supported by the available keyboard. Input methods are often used, for example, to enable entry of Chinese characters or "kanji" by inputting a phonetic representation using Latin characters and then selecting from a menu of possible kanji. In a typical application, as the user types input to a text field, the user will type a predefined character, such as a space, to signal the start of a keystroke sequence that is to be interpreted as a special character. A drop-down box then appears allowing the user to select a non-standard character from a list of choices. Once a choice is made, the non-standard character is placed in the text field, replacing the Latin phonetic representative.

In the preceding example, focus must remain in the text field even while the user is selecting a choice from the drop-down box. This is necessary so that the cursor will continue to blink. Another reason for this is that text fields often employ an input verification mechanism by which it is determined whether the entered characters are of the right type or in the right format when that field loses focus. If the input verification mechanism detects an error, an error message typically will be displayed and the user will be prompted to re-enter the information. Clearly, in the input method example, it would be undesirable to have an input verification mechanism triggered by a change of focus to the drop-down box, because the user would not yet have entered the desired information. Thus, this presents a problem for the typical focus model, where focus would be stolen by the drop-down box upon selection by the user.

A key event dispatcher may be used to implement input methods by defining the special characters that signal the beginning and end of a keystroke sequence. The key event dispatcher also remembers the current state so as to determine whether keystrokes should be diverted to the input method or applied directly to the focus field. When in the "input method mode", the key event dispatcher retargets key events to the input method until an end of the sequence is signaled. Using the key event dispatcher to implement input methods therefore allows the actual input focus to stay in the text field which is receiving input and allows the top-level window ancestor of the text field to remain active.

Figure 8:
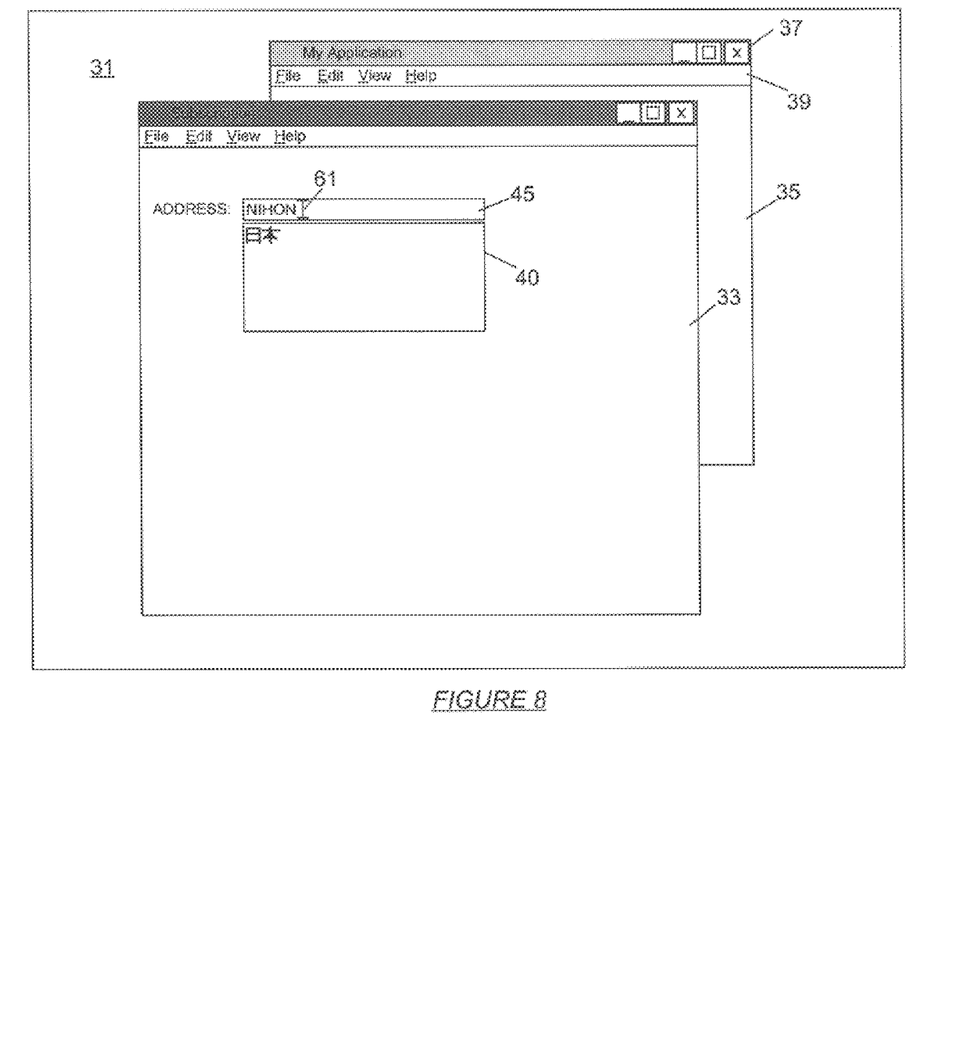
FIG. 8 illustrates an input method embodiment of the invention.
Figure 9:
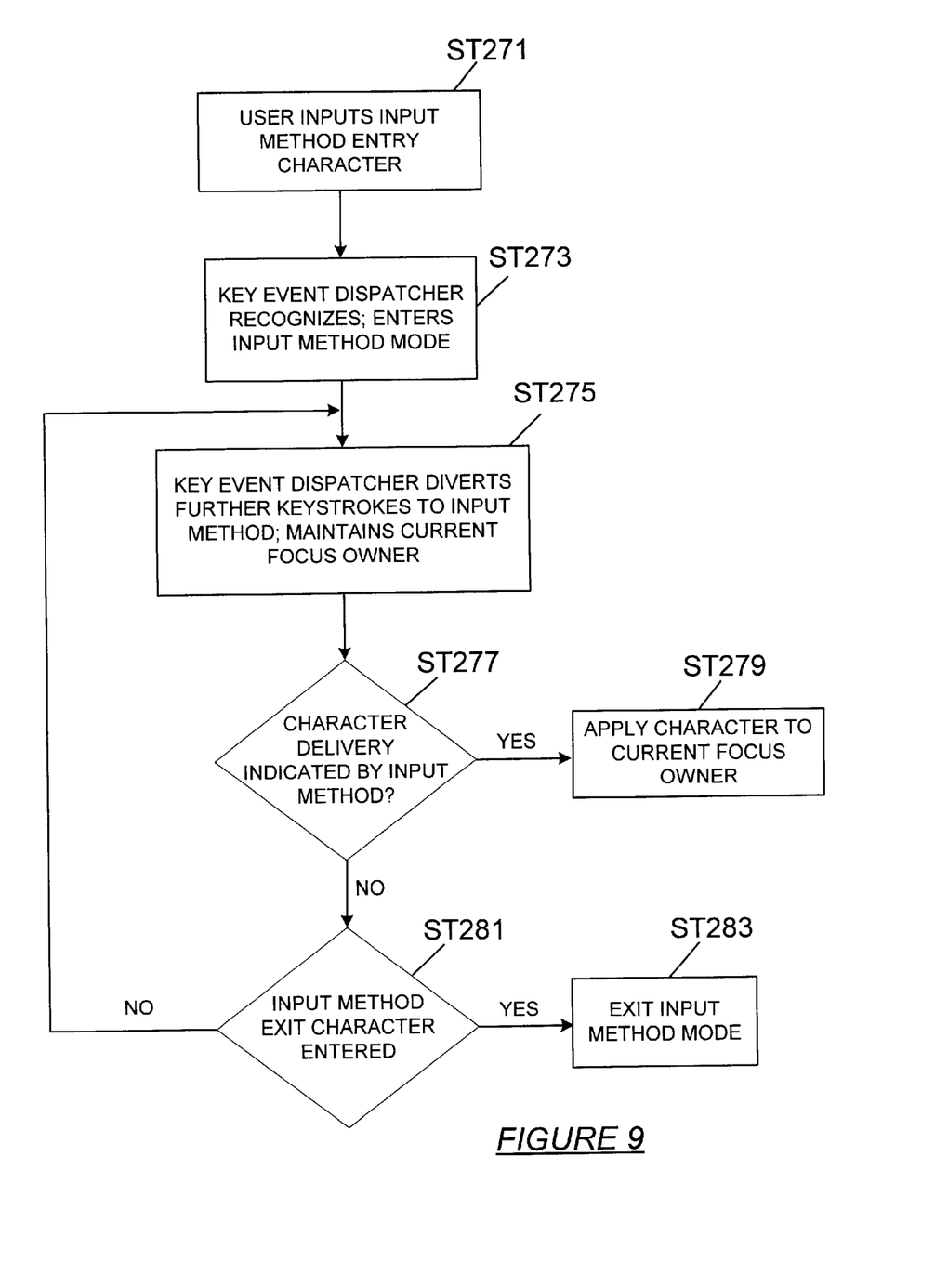
FIG. 9 is a flowchart illustrating a process in accordance with the input method embodiment of FIG. 8.

One possible implementation in accordance with this embodiment of the invention is illustrated by FIG. 8 in combination with the flowchart of FIG. 9. In FIG. 8, window 33 is again the active window. In this example, the user wishes to enter information in the address field 45 using a character set other than that provided on the user's keyboard. Thus, use of an input method is desirable. In order to use an input method implemented in accordance with the invention, the user first inputs an input method entry character (ST271). The key event dispatcher recognizes the input method entry character, and enters the input method mode (ST273). The input method, which may be third party software, then creates a drop-down box 40 with a list of choices corresponding to the entered characters (only one is shown). The key event dispatcher diverts further keystrokes to the input method, but maintains the current focus owner (ST275). Thus, using the example of a Japanese language input method, the user could enter the word "nihon" (the Japanese word for Japan) in Latin characters in field 45. Upon completion of entry of this word, the user would choose an appropriate entry from the list in drop-down box 40 using a special key defined by the input method. When character delivery is indicated by the input method (ST277), the characters corresponding to "nihon" are applied to the current focus owner (ST279). Thus, the Japanese kanji for the word nihon would replace the Latin characters in address field 45. When the user is done with the input method, the user inputs the input method exit character (ST281), causing the key event dispatcher to exit the input method mode (ST283). The input method of FIG. 8 is but one possible approach; many types of input methods exist and may be implemented in accordance with the invention as explained above.

Exemplary applications of the invention to an accessible environment will now be discussed. As explained previously, in order for a system to be accessible to blind users, an application must allow keyboard navigation to each of its components, including those that normally do not accept keyboard input. This is necessary so that, for example, a screen reader may read the component's description. However, in the normal scheme of things the screen reader will be unable to reach those components because they cannot be reached via keyboard focus traversal.

To overcome this difficulty, a key event dispatcher may be used to create a navigation mode wherein components such as labels that do not ordinarily accept keyboard input can be accessed. To do this, the application developer will establish a key event dispatcher that defines special characters signaling the beginning and the end of a special keyboard navigation mode, which in this example will be called "accessible navigation mode." These special characters may be any combination of keystrokes, such as CTRL-ALT-TAB or the like. The beginning and end special characters may be the same or may be different according to the wishes of the developer. While in the accessible navigation mode, the key event dispatcher will recognize specially defined characters as "navigation characters" (e.g., arrow keys), and respond to them by navigating through all components in a window instead of only those that normally accept keyboard input. The key event dispatcher will then forward other characters typed by the user to the currently navigated, rather than the currently focused, component. In this way, a user is able to navigate from one component to another (e.g., for the purpose of reading the descriptions with a screen reader), regardless of whether the components are focusable and without changing the current focus owner.

Another specially defined navigation character, "set focus", allows the user to transfer keyboard focus to the currently navigated component (if it is a focusable component) from the currently focused component. In this way, a blind user is able to navigate until he or she finds a desired component, and then quickly set focus to that field. If the set focus character is entered while the currently navigated component is a non-focusable component, an error is indicated, but no focus transfer occurs.

The manner in which components are traversed in the accessible navigation mode is set by an "accessible keyboard navigation policy." The accessible keyboard navigation policy may be, for example, a policy whereby components are navigated in the order they appear in the window. However, the application developer has the freedom to alter the accessible keyboard navigation policy as desired to suit the needs of a particular application.

Figure 10:
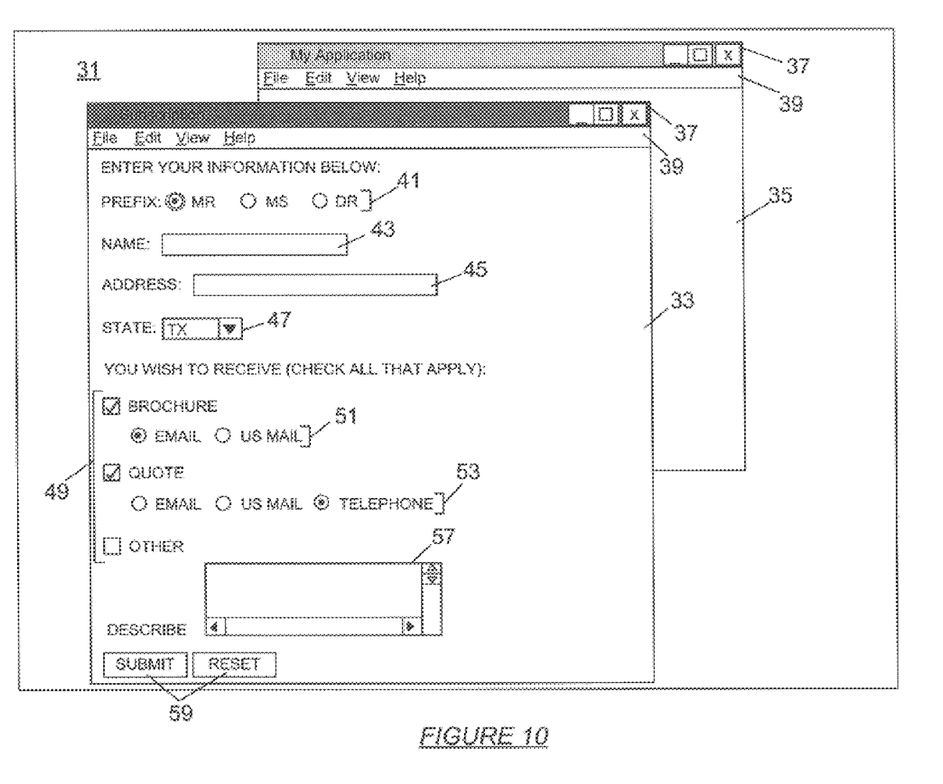
FIG. 10 illustrates a graphical user interface in accordance with an embodiment of the invention.
Figure 11:
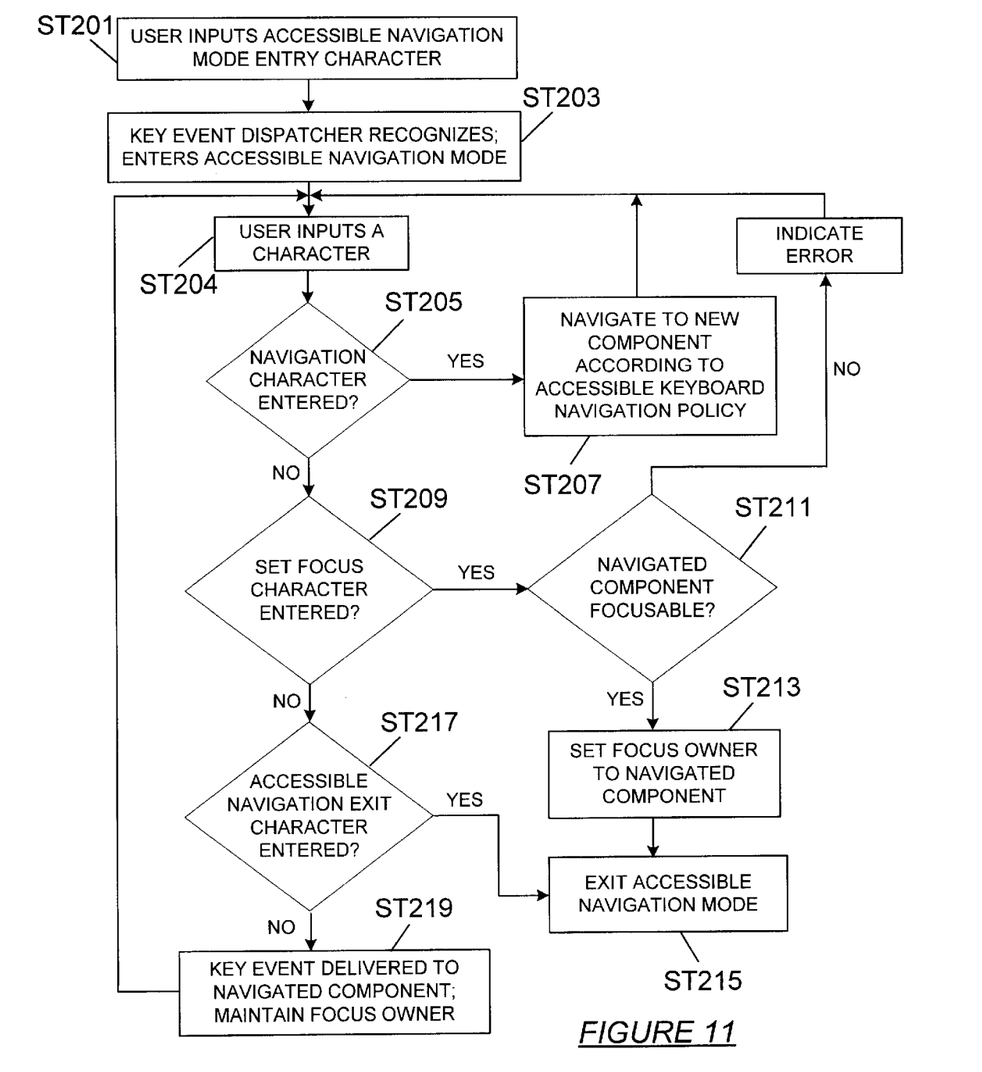
FIG. 11 is a flowchart illustrating a process in accordance with the embodiment of FIG. 10.

An example of one implementation of this embodiment of the invention will now be discussed with reference to FIG. 10. As can be seen, FIG. 10 bears resemblance to FIG. 4 except that window 34 has been removed and window 33 is now the active window. If, for example, focus is currently in the field denoted by "MR" in the radio buttons 41 (as shown by the dotted circle), in accordance with normal focus traversal behavior two strokes of the TAB key would bring focus to the radio button "DR", and a third might bring the cursor into text field 43. An additional stroke of the TAB key will move the cursor into text field 45, and so on throughout the entire window. Consider then an accessible environment where a blind user employs a screen reader. When the cursor skips from the radio buttons 41 to the text field 43 without navigating the label "NAME:", the blind user has no idea what text is to be entered into text field 43. Thus, in accordance with the invention, upon entry into window 33 the user in an accessible environment would enter the accessible navigation mode entry character as indicated in the flowchart of FIG. 11 (ST201). Upon entry of this character, the key event dispatcher registered with the keyboard focus manager recognizes the special character and enters accessible navigation mode (ST203). The user may then input a character (ST204). The key event dispatcher then looks to see if a navigation character has been entered (ST205). If the answer is yes, the system will navigate to a new component according to the accessible keyboard navigation policy (ST207). As noted previously, the accessible keyboard navigation policy may be set in accordance with the developer's wishes. However, any window for which a policy is not explicitly defined may, for example, inherit its policy from an application default. The application default may, for example, establish a navigation policy by which every component in the window is navigated in the order it appears in the window.

Returning to the flowchart of FIG. 11, the key event dispatcher also monitors keystrokes to determine if the set focus character has been entered (ST209). If the set focus character is entered, the key event dispatcher then determines if the currently registered component is focusable (ST211). If so, the current focus owner is set to the current navigated component (ST213), and accessible navigation mode is exited. When in accessible navigation mode, the key event dispatcher also monitors keystrokes to determine if the accessible navigation exit mode character has been entered (ST217). If so, accessible navigation mode is exited (ST215). Thus, returning now to FIG. 10, in accessible navigation mode the user would be able to access, using the keyboard or an equivalent device, not only those components that normally accept keystrokes, but all components in the window. Once a component of interest is located, the user can easily set focus to that component by entering the set focus character.

Application of the keyboard focus manager and the key event dispatcher to navigation of special types of windows will now be described. Windowing toolkits define certain windows, such as floating palettes, that do not ever want to be the active or focused window. Although an application may be written to provide a blind user with another means of accessing the functionality of these windows using, for example, keyboard short-cuts, a more elegant solution is to allow keyboard navigation to such windows as well. The key event dispatcher can be used to navigate to such windows by defining a special character to start a "window navigation mode." The actual key or keys making up the special character can be defined as the developer desires. While in this mode, another special window navigation character (which could be the same character used to enter the mode) is used to move to the next window in an application context. Such navigation does not affect the currently active window or the currently focused component. The key event dispatcher also defines another special character to exit window navigation mode and return to normal key event processing. In this way, keyboard navigation to non-active windows in an accessible environment may be achieved without stealing focus from the currently focused component in the active window and without necessitating a customized programmatic solution.

Figure 12:
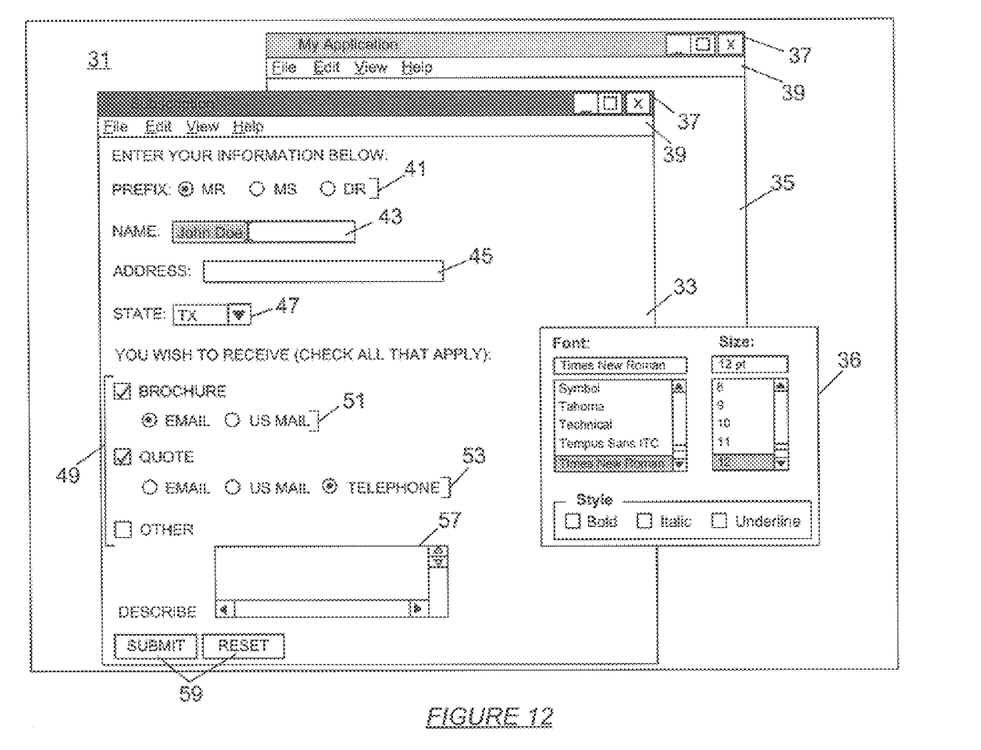
FIG. 12 illustrates a graphical user interface in accordance with another embodiment of the invention.
Figure 13:
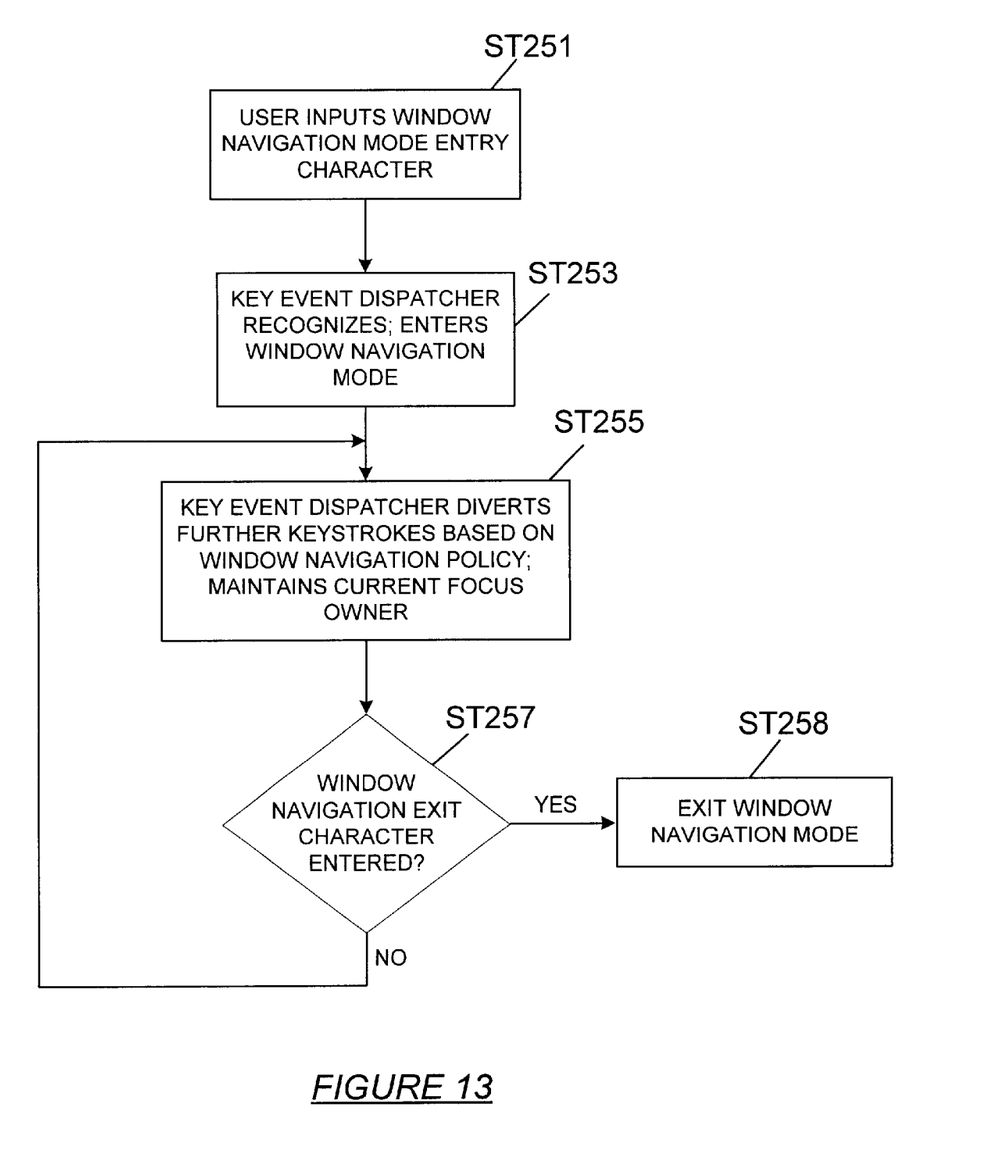
FIG. 13 is a flowchart illustrating a process in accordance with the embodiment of FIG. 12.

One implementation in accordance with this embodiment of the invention is illustrated by the screen shown in FIG. 12 in combination with the flowchart of FIG. 13. In the illustration of FIG. 12, window 33 is again the active window. However, a font chooser 36 is shown that allows the user to select a font while entering a name in, for example, field 43. Normal keyboard navigation would never reach the font chooser because it can never be an active window and does not want to accept keystrokes. Moreover, focus must remain with field 43 due to input verification concerns as explained previously, among others. Nonetheless, it is desirable to provide a mechanism by which the user in an accessible environment can reach this window by focus traversal. In order to reach the font chooser, the user first inputs a window navigation mode entry character (ST251). The key event dispatcher recognizes the window navigation mode entry character, and enters the window navigation mode (ST253). The key event dispatcher then diverts further keystrokes based on the window keyboard navigation policy, but maintains the current focus owner (ST255). In the case shown in FIG. 12, after entering the window navigation mode, the user might employ the window navigation character to move between windows. Once in the correct window, the user typically will then want to enter accessible navigation mode to navigate the components of the new window. In this way, the user can employ window navigation made to reach the desired window, and then employ accessible navigation mode to reach the desired component within that window. Returning to FIG. 12, for example, consider a case where the user wants to enter bold text in field 43. The user would first reach font chooser 36 using window navigation mode, and then use accessible navigation mode to reach the "Bold" component. The user would next enter a pre-defined key such as the space bar, which would make the entered text bold.

While in window navigation mode, the key event dispatcher monitors the keystrokes entered by the user to determine if the window navigation exit character is entered (ST257). If it is, the window navigation mode is exited (ST258).

Figure 5:
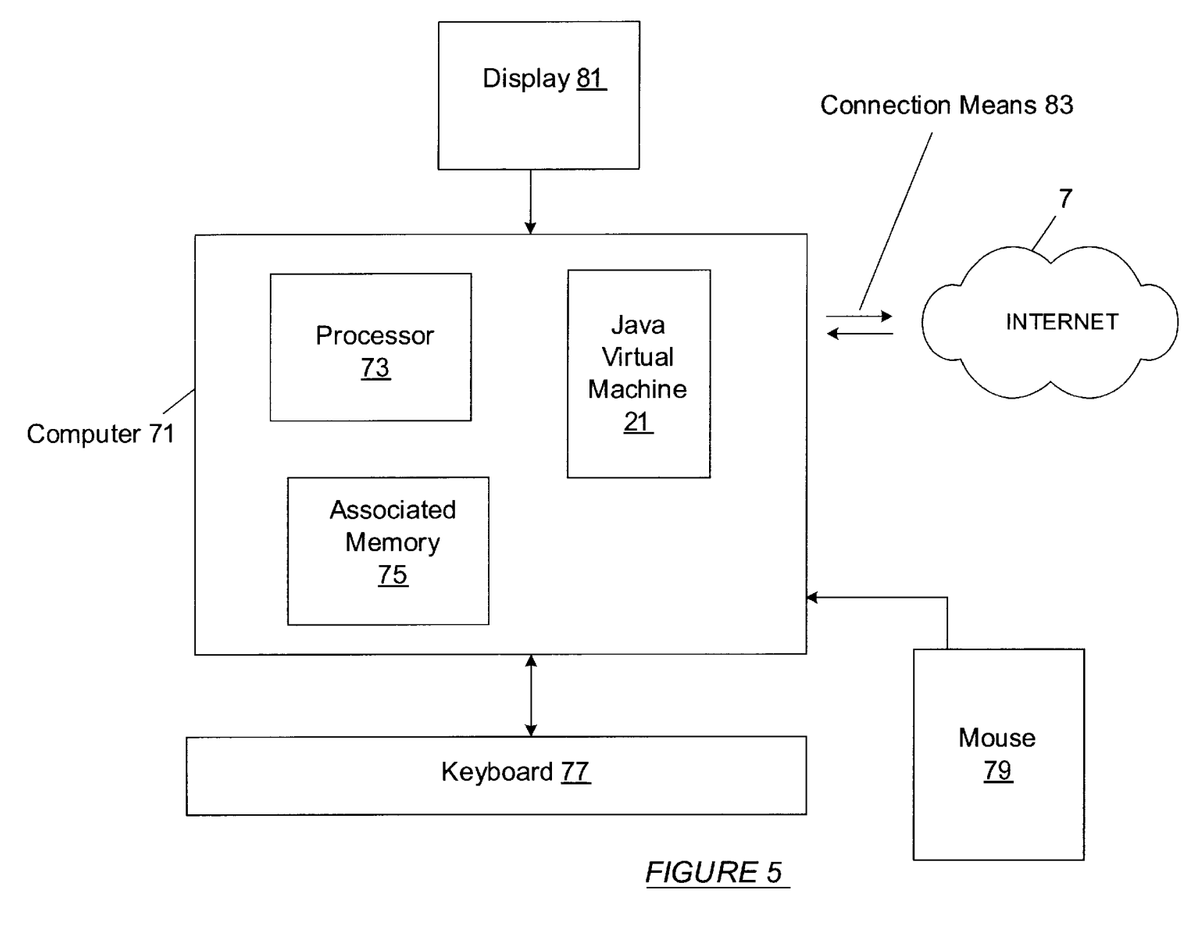
FIG. 5 is a schematic illustration of a typical computer system.

As a result of the invention, the developer is provided with a mechanism by which access to non-focusable components can be more easily established. The developer is provided with a toolkit containing a collection of tools implemented, for example, in the Java™ programming language as shown in FIG. 2 and suitable for execution by a computer such as that shown in FIG. 5. The tools allow the developer to define, for example, key dispatchers for input method objects, accessible navigation modes, and window navigation modes, without necessitating custom programmatic solutions.

Although the invention has been described above in connection with the Java™ programming language, the invention may be implemented in any language in a cross-platform context or on a particular platform. Although the invention has been described above with respect to particular examples, the applicability of the invention is not limited to these specific instances. An application developer will find multiple avenues of applicability for the invention that both enhance functionality and accessibility for the end user and simplify the development process. Accordingly, the invention is not limited to the embodiments described or the examples discussed, but rather is limited only by the scope of the appending claims.

What is claimed is:

1. A method for keyboard navigation in a graphical user interface, comprising:

defining a key event dispatcher for focus ordering of at least one non-focusable component, configured to recognize a special mode entry character and a special mode exit character;

upon entry of the special mode entry character by a user, entering a special mode wherein subsequent key events are manipulated by the key event dispatcher to navigate the focus ordering of the at least one non-focusable component while a current focus owner is maintained; and exiting the special mode upon entry of the special mode exit character by the user, wherein the special mode is at least one of the group consisting of an input method mode, an accessible navigation mode and a window navigation mode.

2. The method of claim 1 wherein the input method mode comprises manipulation of subsequent key events by diverting key events to an input method object.

3. The method of claim 2, further comprising delivering characters to the current focus owner in response to a delivery indication from the input method object.

4. The method of claim 1, wherein the accessible navigation mode comprises manipulation of subsequent key events by using the key events to navigate the graphical user interface in accordance with an accessible navigation policy.

5. The method of claim 4, wherein the key event dispatcher is further configured to recognize a set focus character, and further comprising changing focus from the current focus owner to a currently navigated component upon entry of the set focus character by the user.

6. The method of claim 4, further comprising reading a currently navigated component using a screen reader.

7. The method of claim 1, wherein the window navigation mode comprises manipulation of subsequent key events by using the key events to navigate a plurality of windows in accordance with a window navigation policy.

8. The method of claim 7, further comprising reading a currently navigated component using a screen reader.

9. The method of claim 7, wherein the accessible navigation mode comprising manipulation of subsequent key events and further comprises using the key events to navigate a currently navigated window in accordance with an accessible navigation policy.

10. A windowing toolkit for development of a graphical user interface, the toolkit comprising a plurality of tools having code suitable to be executed by a computer, the toolkit comprising:

a first tool for defining a special mode entry character and a special mode exit character; and a second tool for defining a special mode for focus ordering of at least one non-focusable component, to be entered upon entry of the special mode entry character and to be exited upon entry of the special mode exit character, the second tool providing a manipulation mechanism by which key events are manipulated to navigate the focus ordering of the at least one non-focusable component while in the special mode and while maintaining a current focus owner, wherein the special mode is at least one of the group consisting of an input method mode, an accessible navigation mode and a window navigation mode.

11. The windowing toolkit of claim 10, wherein the manipulation mechanism diverts key events to an input method object while in the input method mode.

12. The method of claim 11, wherein the manipulation mechanism delivers characters to the current focus owner in response to a delivery indication from the input method object.

13. The windowing toolkit of claim 10, wherein the manipulation mechanism uses the key events to navigate the graphical user interface in accordance with an accessible navigation policy while in the accessible navigation mode.

14. The windowing toolkit of claim 13, wherein the first tool further defines a set focus character, and wherein the second tool provides for transfer of focus from the current focus owner to a currently navigated component upon entry of the set focus character.

15. The windowing toolkit of claim 13, wherein the accessible navigation policy provides for navigation to non-focusable components of the graphical user interface.

16. The windowing toolkit of claim 10, wherein the manipulation mechanism uses the key events to navigate a plurality of windows in accordance with a window navigation policy while in the window navigation mode.

17. The windowing toolkit of claim 16, wherein the first tool further defines a set focus character, and wherein the second tool provides for transfer of focus from the current focus owner to a currently navigated component upon entry of the set focus character.

18. The windowing toolkit of claim 16, wherein the window navigation policy provides for navigation to a window that cannot be an active window.

19. The windowing toolkit of claim 16, wherein the special mode defined by the second tool further comprises the accessible navigation mode, and wherein the manipulation mechanism uses the key events to navigate a currently navigated window in accordance with an accessible navigation policy.

* * * * *